Feb. 22, 1966     M. C. KUNZ ETAL     3,237,103
WIDE SCALE METER MOVEMENT WITH INTEGRAL SUPPORT FRAME FOR
THE METER CORE, YOKE, POLE PIECE, MAGNET AND ROTOR
Filed Oct. 23, 1961     2 Sheets-Sheet 2
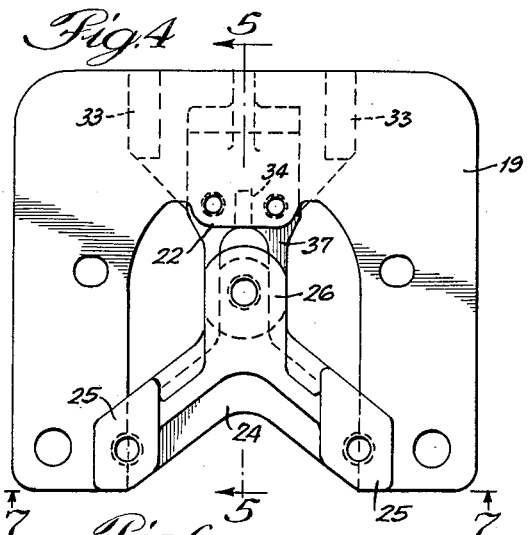
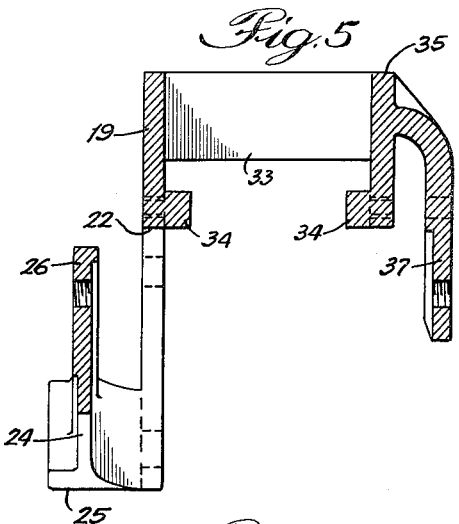
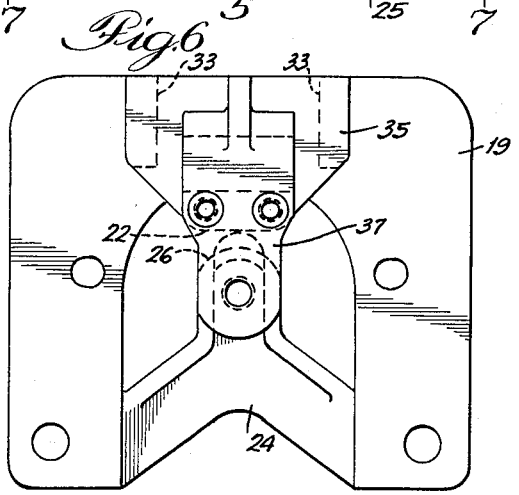
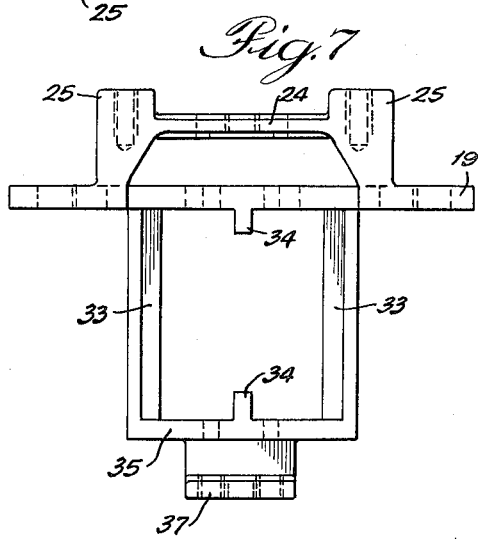
INVENTORS:
Miles C. Kunz &
Edward L. Andrews
BY
ATTORNEYS.

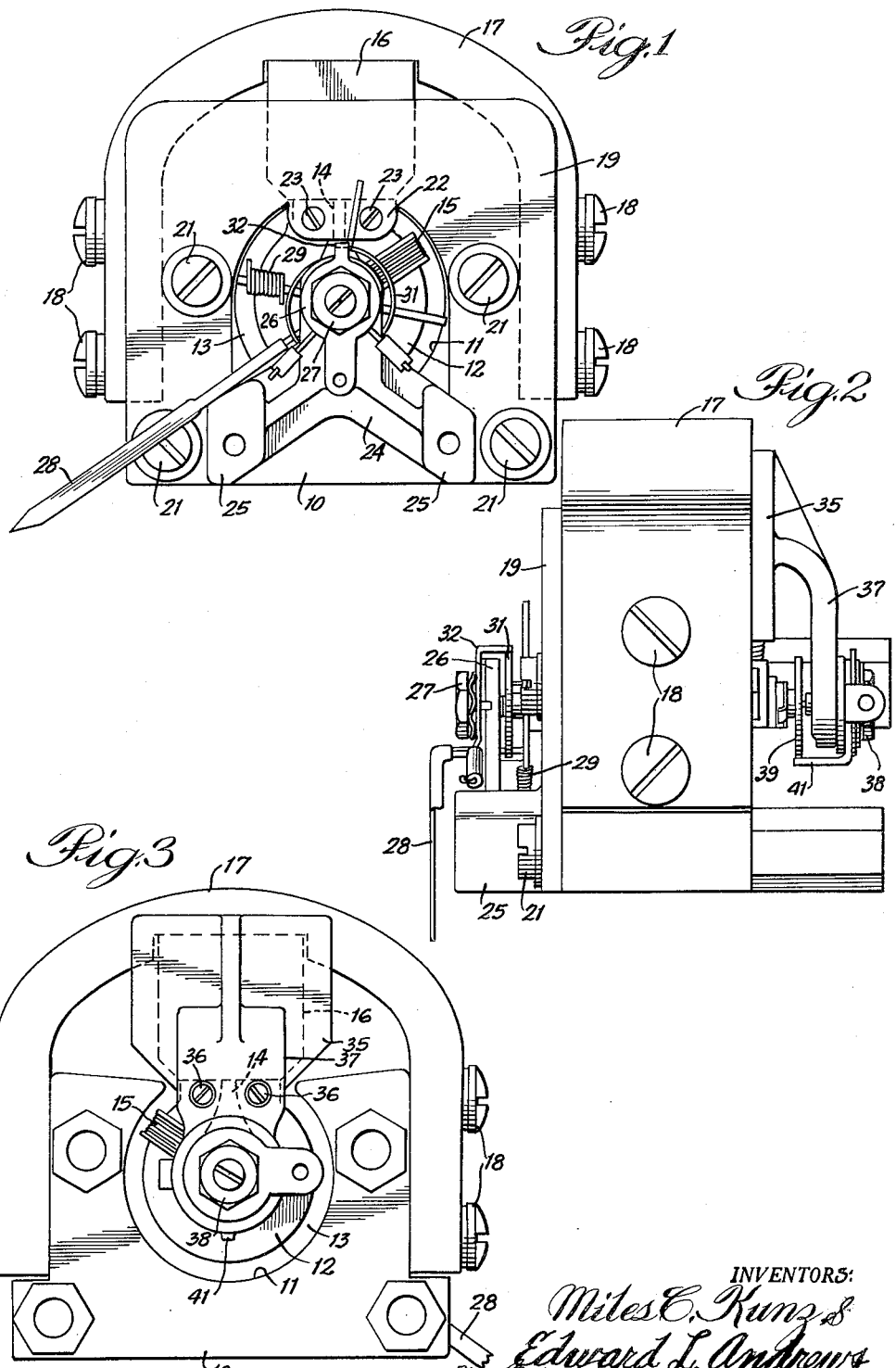

United States Patent Office 3,237,103
Patented Feb. 22, 1966

3,237,103
WIDE SCALE METER MOVEMENT WITH INTEGRAL SUPPORT FRAME FOR THE METER CORE, YOKE, POLE PIECE, MAGNET AND ROTOR
Miles C. Kunz, Palatine, and Edward L. Andrews, Chicago, Ill., assignors to Sun Electric Corporation, Chicago, Ill., a corporation of Illinois
Filed Oct. 23, 1961, Ser. No. 146,795
2 Claims. (Cl. 324—150)

This invention relates to magnetic measuring instruments and more particularly to long scale moving coil instruments.

Long scale moving coil instruments have heretofore been constructed which comprise a core and pole piece defining an arcuate slot in which one leg of the coil can move, a generally rectangular magnet engaging the core and a U-shaped yoke engaging the magnet and connected to the pole piece. In such instruments, the parts have generally been held together by plates clamped over opposing faces of the pole piece, core, magnet and yoke and secured thereto by machine screws or through bolts.

Because of the number of pieces involved and the necessity of positioning them accurately relative to each other, the assembly of such instruments has been a difficult and time consuming operation. Since instruments of this type are used in relatively large numbers and are sold in a competitive market, it is important to simplify the construction and assembly thereof and to minimize the necessity for individual adjustment of the parts through assembly.

It is accordingly one of the objects of the present invention to provide a magnetic measuring instrument in which the number of parts is reduced to a minimum and the parts are so constructed as to be easily assembled and to be accurately and securely held in position relative to each other.

Another object is to provide a magnetic measuring instrument in which all of the parts are held in place by a single unitary frame which also carries bearings for the movable coil.

According to a feature of the invention, the frame is die cast or similarly formed of non-magnetic material with a plate portion overlying and secured to the pole piece and core and with a bridging member connects the plate member to a second smaller plate portion to define an enclosure for receiving the magnet to locate it accurately. Integral arms on the opposite sides of the frame overlie opposite sides of the core and carry bearings for the movable coil.

The above and other objects and features of the invention will be more readily apparent from the following description when read in connection with the accompanying drawings, in which:

FIGURE 1 is a front face view of a magnetic measuring instrument embodying the invention;

FIGURE 2 is a side elevation;

FIGURE 3 is a rear face view;

FIGURE 4 is a front face view of the frame;

FIGURE 5 is a central section on the line 5–5 of FIGURE 4;

FIGURE 6 is a rear face view of the frame; and

FIGURE 7 is an end elevation of the frame on the line 7–7 of FIGURE 4.

The complete instrument, as shown, comprises a pole piece 10 formed of soft iron or similar magnetic material and which is provided with a cylindrical cavity 11 extending therethrough from face to face thereof. The cavity 11 intersects the upper edge of the pole piece, as best seen in FIGURE 3, defining a gap at the upper edge of the pole piece opening into the cylindrical cavity.

A core 12 is mounted within the opening 11 in the pole piece and is formed with a cylindrical outer surface of smaller diameter than the opening 12 to leave a gap 13 therebetween. The core is formed with a central opening therethrough communicating through a slot 14 with one side of the core. At said one side of the core the core terminates in a flat outer surface to engage the magnet, as described more fully hereinafter.

A rectangular moving coil 15 is mounted with one leg extending through to the central opening in the core and the opposite leg positioned in the gap 13 to swing therethrough. The end legs of the coil extend over the opposite end surfaces of the core and the coil is pivotally supported, as described hereinafter, so that it can turn about its pivotal mounting with one leg thereof swinging through the slot 13 and the other turning in the opening in the core. It will be noted that in the construction shown, an angular movement on the order of about 270° is permitted for the coil.

The core engages one end of a generally rectangular magnet 16. As best seen in FIGURE 3, the flattened end portion of the core projects through the gap in the upper edge of the pole piece and the magnet 16 terminates in a flat end abutting against the flat end of the core. The end of the magnet adjacent to the core may be tapered, as shown.

The magnetic circuit is completed by a soft iron yoke 17 whose central portion is notched to provide a flat surface engaging the opposite end of the magnet and whose legs overlie the opposite sides of the pole piece. The legs of the yoke may be secured to the sides of the pole piece by fastenings, such as screws 18. With the several parts in place, as described so far, a magnetic circuit will be completed from the magnet through the yoke and pole piece and across the gap to the core back to the magnet. Thus as the current is passed through the windings of the coil 15, the coil will be deflected proportionately to the current value to give an accurate indication of the applied signal current.

The parts are held in position by a unitary non-magnetic frame which is preferably die cast or similarly formed. The frame, as shown, has an upper plate 19 which, as best seen in FIGURE 1, partially overlies the legs of the yoke and partially overlies the pole piece. The plate may be secured to the pole piece by screws or bolts 21 to hold it accurately in position. The plate 19 is generally U-shaped with an opening in its center through which the pointer connected to the coil can travel and has a short projecting lip 22 at its central portion overlying those portions of the core on opposite sides of the slot 14. Screws or similar fastenings 23 extend through the lip 22 into the adjacent underlying portions of the core and secure the core in place.

The plate is formed with a generally Y-shaped arm 24, two of whose legs are secured to the plate near the ends of the U-legs by means of raised fastening projections 25. The other leg of the Y-shaped arm, as shown at 26, extends over the central opening in the core and carries a bearing 27 for supporting the coil. As seen in FIGURE 2, the coil is provided with a shaft journaled in the bearing and which carries a pointer 28 and a counterbalance member 29. The bearing is preferably of the jeweled type and is adjustable for accurately mounting the coil for free pivotal movement. A coiled spring 31 is secured at one end to the coil supporting shaft and at its opposite end to a bracket 32 adjustably carried by the bearing support 27 urging the coil and pointer in one direction to its zero or no current position.

The frame further includes a pair of spaced parallel bridging pieces 33 extending perpendicularly from the plate through the space between the center portion of the yoke and the upper end of the pole piece. These bridging pieces are preferably formed with small inwardly projecting stop members 34 which fit into the gap 14 in the core to locate the core accurately and which also may engage the adjacent end of the magnet to locate the magnet accurately. At their opposite ends the bridging pieces carry a smaller plate member 35, as best seen in FIGURES 3 and 6, which overlies the opposite face of the magnet. The plate member 35 projects over the adjacent portions of the core 12 on opposite sides of the slot 14 therein and may be secured to the core by screws or similar fastenings 36, as seen in FIGURE 3. The plate member 35 also has integrally formed therewith an arm 37 which extends over the central portion of the core and carries a bearing 38 for the core supporting shaft similar to the bearing 27. A second coil spring 39 may be secured to the coil supporting shaft and anchored to a bracket 41 carried by the bearing 38, as seen in FIGURE 2, to assist the coil spring 31.

In assembling the instrument of the present invention, the several parts may be easily positioned on the yoke and may be fastened thereto simply by inserting the screws 21, 23 and 36. The coil is, of course, first inserted through the slot 14 so that one leg thereof will lie in the central opening in the core and the core and coil assembly are then inserted into the opening 11 in the pole piece. The magnet may be dropped into the pocket defined by the plates 19 and 35 and the bridging members 33 and will be accurately held and positioned thereby. The frame may then be moved over the pole and core pieces with the projections 34 entering the gap 14 in the core to locate it accurately and with the end of the magnet abutting the flat face on the core. Thereafter, the several fastenings and the bearing supports for the coil shaft may be inserted and adjusted. The yoke 17 can then be positioned over the pole piece with the flat recessed surface thereof engaging the other end of the magnet and the screws 18 can be inserted to complete the assembly.

It will be seen that with the present invention, all of the parts, with the exception of the yoke, are accurately held and positioned by the unitary frame structure. This not only facilitates the operation of assembling the parts, but further insures that they will be accurately assembled and will be held accurately in their desired relationship with each other with a minimum amount of handling and with the use of a minimum number of fastenings.

While one embodiment of the invention has been shown and described herein, it will be understood that it is illustrative only and not to be taken as a definition of the scope of the invention, reference being had for this purpose to the appended claims.

What is claimed is:

1. In a magnetic measuring instrument having a cylindrical magnetic core formed with a central opening therethrough and a gap at one side communicating with the opening, a magnetic pole piece formed with a cylindrical cavity opening at one side thereof and into which the core fits in spaced relation thereto, a U-shaped yoke whose sides engage the sides of the pole piece and whose central portion lies spaced from said one side of the pole piece, a coil having one leg passing through the central opening in the core and another leg swingable in the space between the core and the pole piece, and a magnet engaging the central portion of the yoke and the core, the combination of an integral supporting frame of non-magnetic material including a flat plate portion overlying and secured to one face of the pole piece and having a part overlying and secured to the core adjacent to the magnet, an arm carried by the plate projecting over the core and carrying a bearing for the coil, bridging members extending from the plate portion through the spaces between the yoke and pole piece at the sides of the magnet to the other faces of the pole piece and core, a second plate portion carried by the bridging members overlying the magnet, the plate portions and bridging members confining and locating the magnet, and a second arm projecting from the second plate portion over the other face of the core and carrying a second bearing for the coil.

2. In a magnetic measuring instrument having a cylindrical magnetic core formed with a central opening therethrough and a gap at one side communicating with the opening, a magnetic pole piece formed with a cylindrical cavity opening at one side thereof and into which the core fits in spaced relation thereto, a U-shaped yoke whose sides engage the sides of the pole piece and whose central portion lies spaced from said one side of the pole piece, a coil having one leg passing through the central opening in the core and another leg swingable in the space between the core and the pole piece, and a magnet engaging the central portion of the yoke and the core, the combination of an integral supporting frame of non-magnetic material including a flat plate portion overlying and secured to one face of the pole piece and having a part overlying and secured to the core adjacent to the magnet, an arm carried by the plate projecting over the core and carrying a bearing for the coil, bridging members extending from the plate portion through the spaces between the yoke and pole piece at the sides of the magnet to the other faces of the pole piece and core, a second plate portion carried by the bridging members overlying the magnet, the plate portions and bridging members confining and locating the magnet, lugs projecting inwardly from the plate portions and fitting into the gap in the core to locate the core, and a second arm projecting from the second plate portion over the other face of the core and carrying a second bearing for the coil.

References Cited by the Examiner

UNITED STATES PATENTS 2,848,662  8/1958  Barry _____ 324—150

FOREIGN PATENTS 125,138  8/1947  Australia.
451,792  10/1948  Canada.
943,994  3/1949  France.

WALTER L. CARLSON, *Primary Examiner.*